United States Patent
Bodary (10) Patent No.: US 11,111,998 B1
(45) Date of Patent: Sep. 7, 2021

(54) AXLE ASSEMBLY HAVING A VARIABLE LUBRICANT RESTRICTOR

(71) Applicant: ArvinMeritor Technology, LLC, Troy, MI (US)

(72) Inventor: Andrew Bodary, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/088,017

(22) Filed: Nov. 3, 2020

(51) Int. Cl.
| | |
|---|---|
| *F16H 57/04* | (2010.01) |
| *F16H 57/03* | (2012.01) |
| *F16H 57/037* | (2012.01) |
| *F16H 57/08* | (2006.01) |
| *F16H 57/02* | (2012.01) |

(52) U.S. Cl.
CPC ....... *F16H 57/0409* (2013.01); *F16H 57/037* (2013.01); *F16H 57/0423* (2013.01); *F16H 57/0457* (2013.01); *F16H 57/0471* (2013.01); *F16H 57/0483* (2013.01); *F16H 57/082* (2013.01); *F16H 2057/02052* (2013.01)

(58) Field of Classification Search
None
See application file for complete search history.

(56) References Cited

U.S. PATENT DOCUMENTS

| | | | | |
|---|---|---|---|---|
| 3,601,515 | A | * | 8/1971 | Pelizzoni ............ F16H 57/0493 418/206.4 |
| 4,470,324 | A | * | 9/1984 | Renk ................... F16H 57/0423 74/606 R |
| 4,560,056 | A | * | 12/1985 | Stockton ................. F16D 21/06 184/11.1 |
| 10,167,944 | B2 | | 1/2019 | Kwasniewski et al. |
| 10,179,477 | B2 | | 1/2019 | Eschenburg et al. |
| 10,208,846 | B2 | | 2/2019 | Chinitz |
| 10,364,872 | B2 | | 7/2019 | Keeney et al. |
| 2020/0047613 | A1 | | 2/2020 | Eschenburg et al. |

* cited by examiner

*Primary Examiner* — Colby M Hansen
(74) *Attorney, Agent, or Firm* — Brooks Kushman PC (57) ABSTRACT

An axle assembly having a variable lubricant restrictor. The variable lubricant restrictor may be mounted to a differential carrier. Lubricant that is splashed by the differential assembly may move the variable lubricant restrictor from a first position to a second position to reduce lubricant flow through a divider wall opening.

20 Claims, 7 Drawing Sheets

AXLE ASSEMBLY HAVING A VARIABLE LUBRICANT RESTRICTOR

TECHNICAL FIELD

This disclosure relates to an axle assembly that has a variable lubricant restrictor.

BACKGROUND

An axle assembly having a lubricant reservoir is disclosed in U.S. Pat. No. 10,167,944.

SUMMARY

In at least one embodiment, an axle assembly is provided. The axle assembly may include an axle housing, a differential carrier, a differential assembly, and a variable lubricant restrictor. The differential carrier may be mounted to the axle housing and may support a drive pinion that is rotatable about a drive pinion axis. The differential carrier may include a divider wall. The divider wall may at least partially define a divider wall opening. The differential carrier and the axle housing may cooperate to at least partially define a cavity that has a sump portion that receives lubricant. The differential assembly may be received in the cavity and may be rotatable about an axis. The variable lubricant restrictor may be mounted to the divider wall proximate the divider wall opening. Lubricant that is splashed by the differential assembly may move the variable lubricant restrictor from a first position to a second position to reduce lubricant flow through the variable lubricant restrictor.

In at least one embodiment, an axle assembly is provided. The axle assembly may include an axle housing, a differential carrier, a differential assembly, and a variable lubricant restrictor. The differential carrier may be mounted to the axle housing and may support a drive pinion that is rotatable about a drive pinion axis. The differential carrier may include a divider wall. The divider wall may define a divider wall opening. The differential carrier and the axle housing may cooperate to at least partially define a cavity that has a sump portion that receives lubricant. The differential assembly may be received in the cavity, may be supported by the differential carrier, and may be rotatable about an axis. The variable lubricant restrictor may be mounted to the divider wall proximate the divider wall opening. The variable lubricant restrictor may have a flap that may extend toward the differential assembly. Lubricant that is splashed by the differential assembly may move the flap toward the divider wall to reduce lubricant flow through the divider wall opening.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
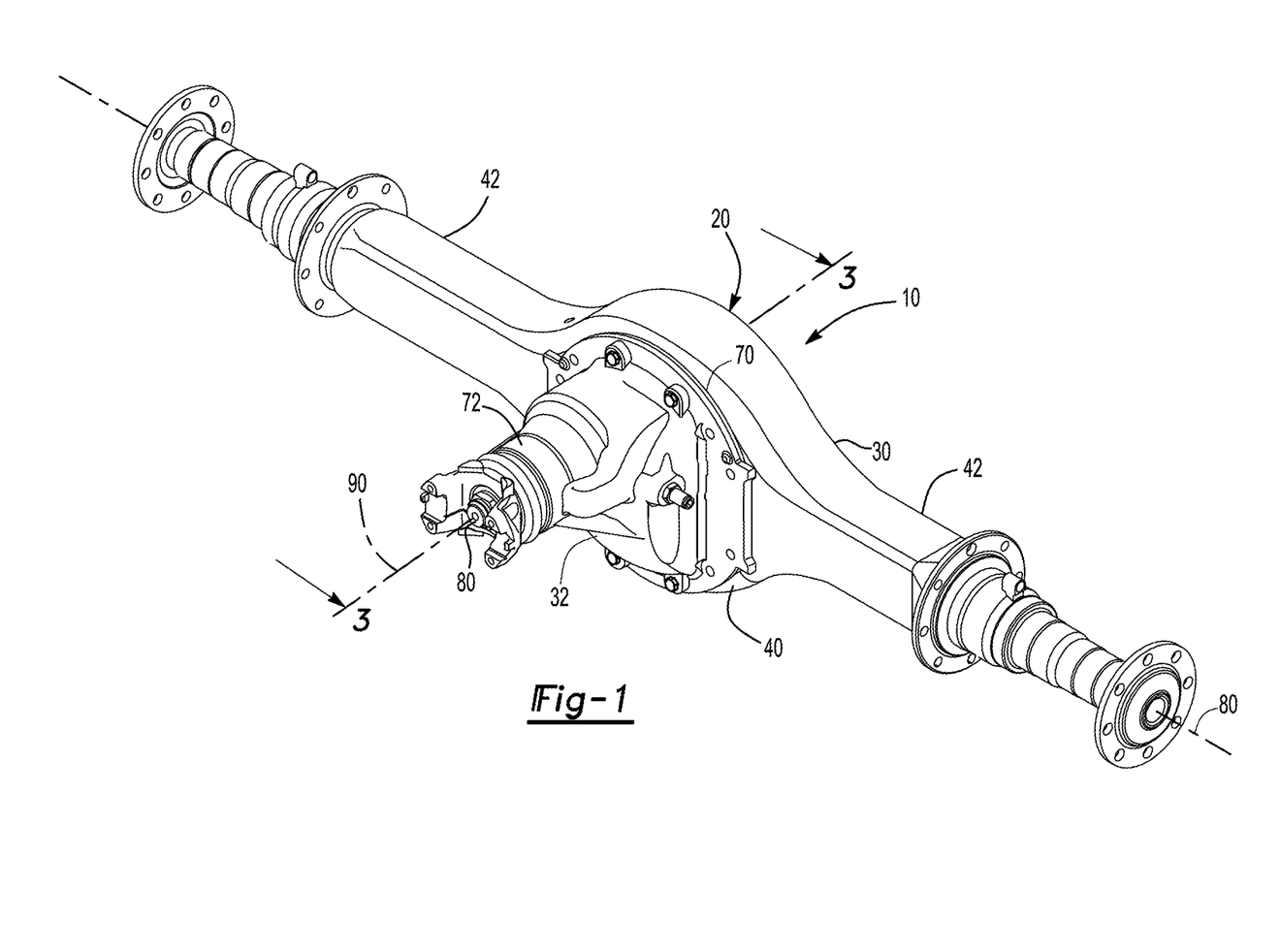
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

Figure 2:
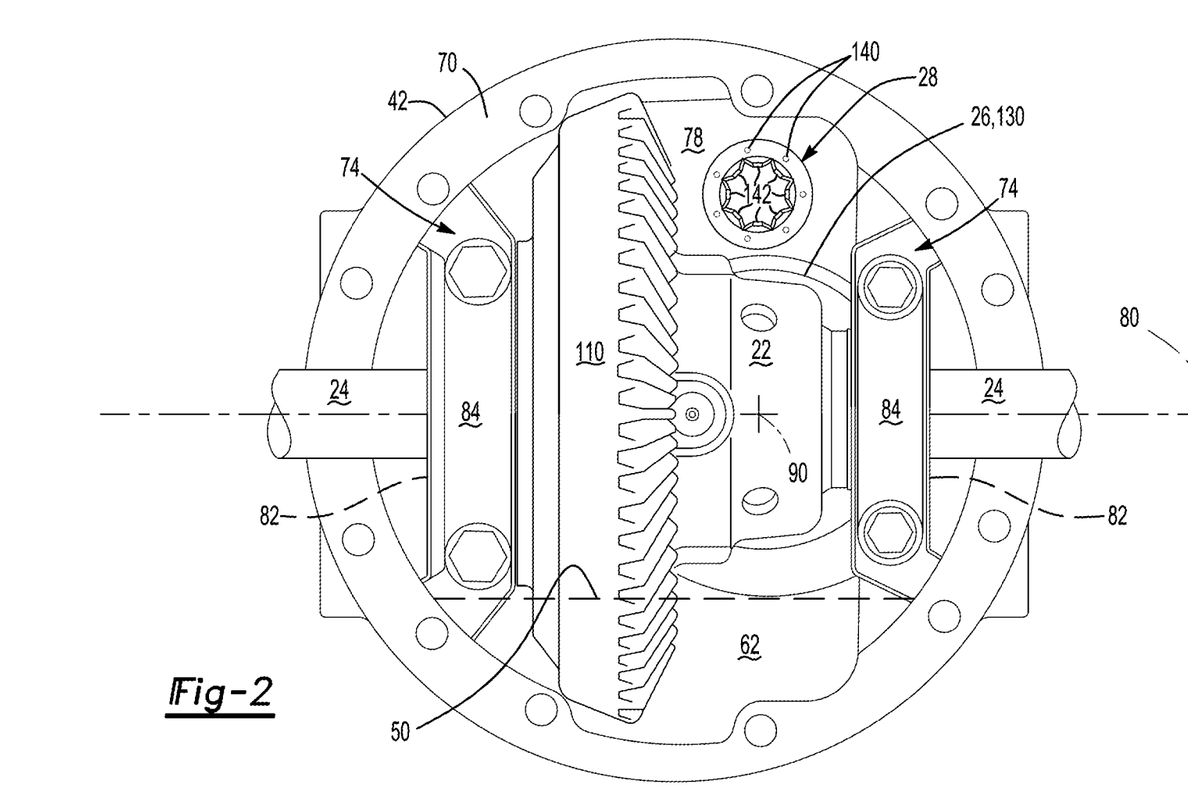
FIG. 2 is a side view of a portion of the axle assembly without an axle housing that shows an example of a variable lubricant restrictor in a first position.
Figure 3:
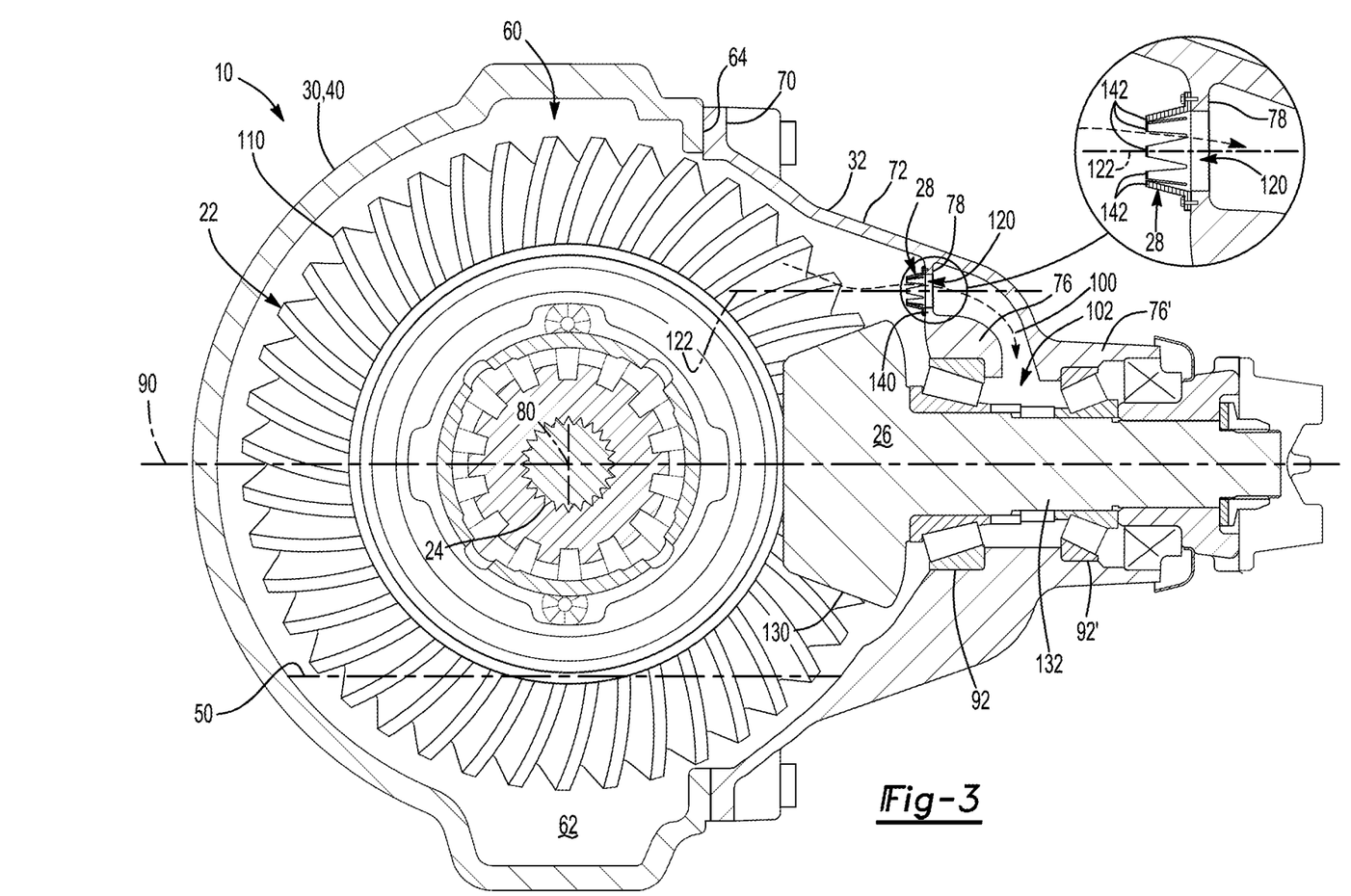
FIG. 3 is a section view along section line 3-3.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown in FIG. 1, the axle assembly 10 may include a housing assembly 20. As is best shown in FIGS. 2 and 3 the axle assembly 10 may include a differential assembly 22, at least one axle shaft 24, a drive pinion 26, and at least one variable lubricant restrictor 28.

Referring to FIG. 1, the housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axle shafts 24. In at least one configuration, the axle housing 30 may include a center portion 40 and at least one arm portion 42.

The center portion 40 may be disposed proximate the center of the axle housing 30. As is best shown in FIG. 3, the center portion 40 of the axle housing 30 may cooperate with the differential carrier 32 to at least partially define a cavity 60 that may receive the differential assembly 22. The cavity 60 may have a sump portion 62 that may receive and may contain lubricant 50. The sump portion 62 may be disposed at the bottom of the cavity 60 and may be generally located below the differential assembly 22. The sump portion 62 may be primarily defined by the center portion 40 and may be a location where lubricant 50 may drain and collect. For instance, splashed lubricant 50 may flow down the sides of the center portion 40 and may flow over internal components of the axle assembly 10 and gather in the sump portion 62.

The lubricant 50, which may be a liquid such as oil, may lubricate components of the axle assembly 10, such as rotatable components like the differential assembly 22, drive pinion 26, and various bearings. In FIG. 3, lubricant 50 in the sump portion 62 is represented by a dashed line. The level of lubricant 50 represented by the dashed line is an example and may be higher or lower than the positioning depicted.

Referring to FIG. 3, center portion 40 may also include a carrier mounting surface 64. The carrier mounting surface 64 may face toward and may engage the differential carrier 32. The carrier mounting surface 64 may facilitate mounting of the differential carrier 32 to the axle housing 30. For example, the carrier mounting surface 64 may have a set of holes that may be aligned with corresponding holes on the differential carrier 32. Each hole may receive a fastener, such as a bolt, that may couple the differential carrier 32 to the axle housing 30.

Referring to FIG. 1, one or more arm portions 42 may extend from the center portion 40. For example, two arm portions 42 may extend in opposite directions from the center portion 40 and away from the differential assembly 22. The arm portions 42 may have substantially similar configurations. For example, the arm portions 42 may each have a hollow configuration or tubular configuration that may extend around the corresponding axle shaft 24 and may help separate or isolate the axle shaft 24 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 24. The arm portion 42 and arm cavity may be disposed above the sump portion 62 in one or more configurations.

Referring to FIGS. 1 and 3, the differential carrier 32, which may also be called a carrier housing, may be mounted to the center portion 40 of the axle housing 30. In at least one configuration, the differential carrier 32 may extend from the center portion 40 in a direction that may be generally perpendicular to the arm portions 42. The differential carrier 32 may support various components of the axle assembly 10, such as the differential assembly 22, drive pinion 26, variable lubricant restrictor 28, or combinations thereof. In at least one configuration and as is best shown in FIGS. 1 and 2, the differential carrier 32 may have a flange portion 70 and an exterior wall 72. As is best shown in FIGS. 2 and 3, the differential carrier 32 may have at least one differential bearing support 74, at least one drive pinion bearing support 76, 76', and a divider wall 78.

Referring to FIGS. 1 and 3, the flange portion 70 may facilitate mounting of the differential carrier 32 to the axle housing 30. For example, the flange portion 70 may be disposed proximate and may engage the carrier mounting surface 64 of the axle housing 30 and may have a set of holes that may receive fasteners as previously discussed.

The exterior wall 72 may extend from the flange portion 70. For instance, the exterior wall 72 may extend from the flange portion 70 in a direction that may extend away from the axle housing 30. The exterior wall 72 may at least partially define an exterior or exterior side of the differential carrier 32. The exterior wall 72 may extend around and may be spaced apart from the drive pinion 26.

Referring to FIG. 2, one or more differential bearing supports 74 may be provided with the differential carrier 32. In the configuration shown, a pair of differential bearing supports 74 are provided that may be disposed proximate opposite ends of the differential assembly 22. The differential bearing supports 74 may facilitate mounting of the differential assembly 22 such that the differential assembly 22 may be rotatable about an axis 80. For instance, a differential bearing support 74 may receive a roller bearing assembly 82 that may rotatably support the differential assembly 22. The differential bearing supports 74 may be located inside the center portion 40 when the differential carrier 32 is mounted to the axle housing 30 and may suspend the differential assembly 22 inside the center portion 40. In at least one configuration, a differential bearing support 74 may include a pair of legs that extend toward the center portion 40 and a bearing cap 84. A bearing cap 84 may be mounted to the legs and may arch over a roller bearing assembly 82. (The roller bearing assemblies are hidden underneath the bearing caps 84 in FIG. 2.) As such, the legs and bearing cap 84 may cooperate to extend around, receive, and secure the roller bearing assembly 82.

Referring to FIG. 3, one or more drive pinion bearing supports 76, 76' may be provided with the differential carrier 32. A drive pinion bearing support 76, 76' may facilitate mounting of the drive pinion 26 such that the drive pinion 26 may be rotatable about a drive pinion axis 90. For instance, a drive pinion bearing support 76, 76' may encircle or may receive a drive pinion bearing assembly 92, 92' that may rotatably support the drive pinion 26. In at least one configuration, a drive pinion bearing support 76, 76' may extend from the exterior wall 72 toward the drive pinion axis 90. In the configuration shown in FIG. 3, two drive pinion bearing supports are shown. For convenience in reference, the drive pinion bearing support that is located closest to the differential assembly 22 may be referred to as a first drive pinion bearing support 76. The drive pinion bearing support that is located furthest from the differential assembly 22 may be referred to as a second drive pinion bearing support 76'. Similarly, the drive pinion bearing assembly that may be received in the first drive pinion bearing support 76 may be referred to as a first drive pinion bearing assembly 92 while the drive pinion bearing assembly that may be received in the second drive pinion bearing support 76' may be referred to as a second drive pinion bearing assembly 92'.

The first drive pinion bearing support 76 may be partially spaced apart from the exterior wall 72 such that the exterior wall 72 and the first drive pinion bearing support 76 may cooperate to at least partially define a channel 100. The channel 100 may extend away from the differential assembly 22 or to the right from the perspective shown in FIG. 3, and then may extend toward the drive pinion axis 90 or downward from the perspective shown. As such, the channel 100 may extend between and may be partially defined by the first drive pinion bearing support 76 and the second drive pinion bearing support 76'. The channel 100 may be configured to receive lubricant 50 that is splashed by one or more rotating components of the axle assembly 10, such as the differential assembly 22, the drive pinion 26, or both, and route lubricant 50 to a chamber 102 that may be axially positioned or positioned along the drive pinion axis 90 between the first drive pinion bearing assembly 92 and the second drive pinion bearing assembly 92'.

The first and second drive pinion bearing assemblies 92, 92' may have any suitable configuration. For instance, the first and second drive pinion bearing assemblies 92, 92' may be configured as tapered roller bearing assemblies that may cooperate to inhibit movement of the drive pinion 26 along the drive pinion axis 90. The first drive pinion bearing assembly 92 may be axially positioned along the drive pinion axis 90 closer to the differential assembly 22 than the second drive pinion bearing assembly 92'. In at least one configuration, the first drive pinion bearing assembly 92 or a portion thereof may be axially positioned along the drive pinion axis 90 closer to the differential assembly 22 than the divider wall 78 is positioned to the differential assembly 22. The second drive pinion bearing assembly 92' may be axially positioned further from the differential assembly 22 than the divider wall 78 is positioned from the differential assembly 22.

Referring to FIGS. 2 and 3, the divider wall 78 may be disposed at an end of the channel 100. In at least one configuration, the divider wall 78 may extend from the exterior wall 72 toward the drive pinion 26 and the drive pinion axis 90. For instance, the divider wall 78 may extend from an interior side of the exterior wall 72 that may face toward the drive pinion axis 90 to the first drive pinion bearing support 76. In at least one configuration, the divider wall 78 may be disposed substantially perpendicular to the drive pinion axis 90.

The divider wall 78 may be at least partially disposed above the drive pinion 26 and the drive pinion axis 90. For instance, the divider wall 78 may be disposed directly above the first drive pinion bearing assembly 92 and a shaft portion of the drive pinion 26. It is also contemplated that the divider wall 78 may be provided in other positions. For instance, it is also contemplated that the divider wall 78 may be disposed further to the left from the position shown such that the divider wall 78 is disposed above a gear portion of the drive pinion 26. In such a configuration, it is also contemplated that the first drive pinion bearing support 76 may be extended further to the left to overhang the gear portion of the drive pinion 26. The divider wall 78 may define at least one divider wall opening 120.

The divider wall opening 120 may be a through hole that may extend through the divider wall 78. The divider wall opening 120 may be an inlet of the channel 100. In at least one configuration, the divider wall opening 120 may be centered about a divider wall opening center line 122. The divider wall opening center line 122 may extend parallel or substantially parallel to the drive pinion axis 90.

Referring to FIGS. 2 and 3, the differential assembly 22 may be at least partially received in the center portion 40 of the axle housing 30. The differential assembly 22 may transmit torque to the axle shafts 24 and associated wheels and may permit the axle shafts 24 and wheels to rotate at different velocities under various driving conditions. For instance, the differential assembly 22 may have a ring gear 110 that may have a set of teeth that may mesh with teeth of the drive pinion 26 and receive torque from the drive pinion 26. The ring gear 110 may be fixedly mounted to a case or housing of the differential assembly 22 and may be rotatable about the axis 80. The case may receive gears that may be operatively connected to the axle shafts 24 and that may transmit torque to the axle shafts 24 in a manner known by those skilled in the art. The ring gear 110 may splash lubricant 50 that accumulates in the sump portion 62 as it rotates.

The axle shafts 24 may transmit torque from the differential assembly 22 to corresponding traction wheel assemblies. For example, two axle shafts 24 may be provided such that each axle shaft 24 extends through a different arm portion 42 of the axle housing 30. In at least one configuration, the axle shafts 24 or a portion thereof may extend along and may be rotatable about the axis 80 by the differential assembly 22. Each axle shaft 24 may have a first end and a second end. The first end may be operatively connected to the differential assembly 22. The second end may be disposed opposite the first end and may be operatively connected to a wheel.

Referring primarily to FIG. 3, the drive pinion 26 may provide torque to the ring gear 110 of the differential assembly 22. In at least one configuration, the drive pinion 26 may include a gear portion 130 and a shaft portion 132.

The gear portion 130 may be disposed at or near an end of the shaft portion 132. The gear portion 130 may have a plurality of teeth that may mesh with or mate with corresponding teeth on the ring gear 110. The gear portion 130 may be integrally formed with the shaft portion 132 or may be provided as a separate component that may be fixedly disposed on the shaft portion 132.

The shaft portion 132 may extend from the gear portion 130 in a direction that extends away from the axle housing 30. For instance, the shaft portion 132 may extend along or around the drive pinion axis 90 and may extend away from the differential assembly 22. The drive pinion axis 90 may be disposed perpendicular or substantially perpendicular to the axis 80 and may be disposed above, below, or may intersect the axis 80. The shaft portion 132 may be operatively connected to a power source, such as an electric motor or internal combustion engine that may provide torque to rotate the drive pinion 26 about the drive pinion axis 90.

Figure 4:
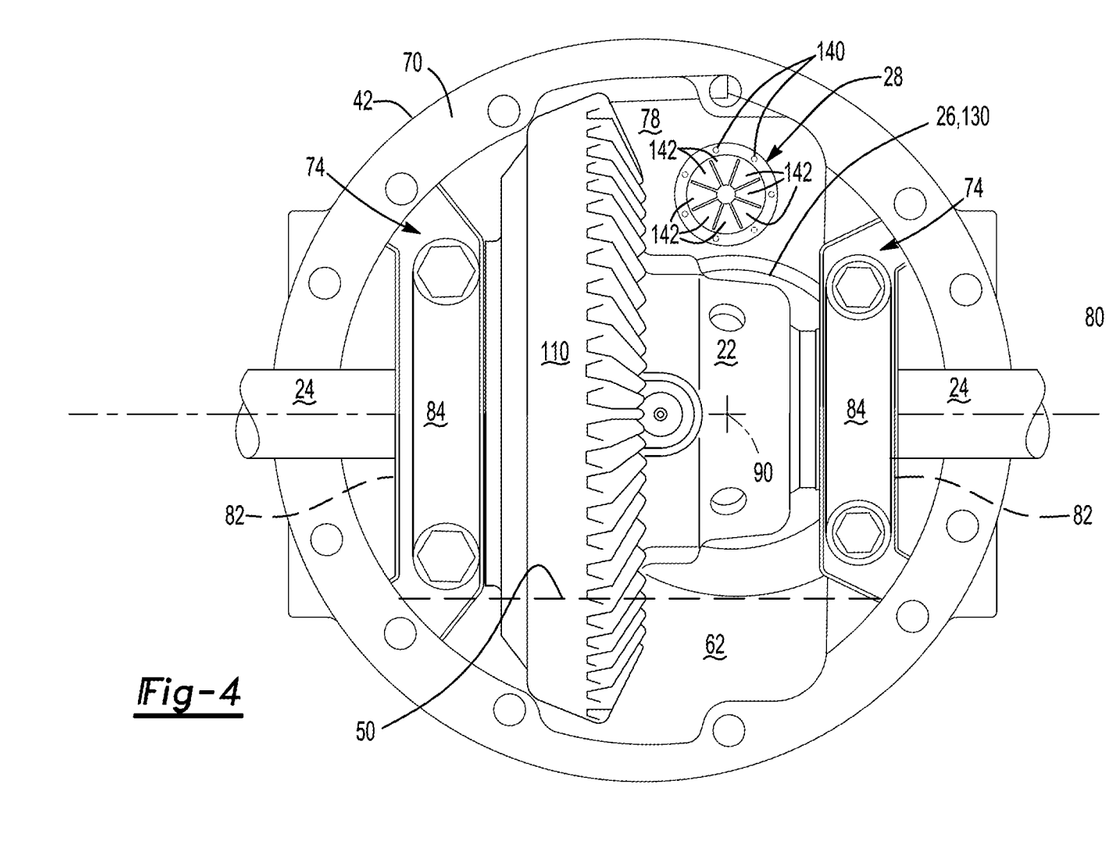
FIG. 4 is a side view of the axle assembly without the axle housing that shows the variable lubricant restrictor in a second position.

Referring to FIGS. 2-4, an example of a variable lubricant restrictor 28 is shown. The variable lubricant restrictor 28 may control the amount of lubricant 50 that may flow through the divider wall opening 120 and into the channel 100. As such, the variable lubricant restrictor 28 may control the flow of lubricant to the chamber 102 and to at least one drive pinion bearing assembly 92, 92' as will be discussed in more detail below. The variable lubricant restrictor 28 may be mounted to the divider wall 78 proximate or adjacent to the divider wall opening 120 or a corresponding divider wall opening 120. For instance, the variable lubricant restrictor 28 may be disposed on a side of the divider wall 78 that may face toward the differential assembly 22. In the configuration shown in FIGS. 2-4, the variable lubricant restrictor 28 may include a mounting portion 140 and a set of flaps 142.

The mounting portion 140 may facilitate mounting of the variable lubricant restrictor 28 to the differential carrier 32. In at least one configuration, the mounting portion 140 may be configured as a ring that may extend partially or continuously around the divider wall opening 120. In the configuration shown, the mounting portion 140 is illustrated as being generally aligned with but disposed outside of the divider wall opening 120; however, it is contemplated that the mounting portion 140 or a portion thereof may be disposed in the divider wall opening 120, may be disposed on or extend to an opposite side of the divider wall 78, or combinations thereof. The mounting portion 140 may be fixedly mounted to the divider wall 78 in any suitable manner, such as with one or more fasteners, an adhesive, an interference fit, or the like.

A set of flaps 142 may extend from the mounting portion 140. In the configuration shown in FIGS. 2-4, eight flaps are illustrated; however, it is contemplated that a greater or lesser number of flaps may be provided. The flaps 142 may be provided with common configurations or different configurations. In the configuration shown, the flaps 142 have a generally triangular shape; however it is contemplated that different flap shapes may be provided that may or may not have linear edges. In at least one configuration, the flaps 142 may be cantilevered from the mounting portion 140. For instance a flap 142 may have a first end that may engage or contact the mounting portion 140 and a second end (i.e., free end or distal end) that may be disposed opposite the first end. In at least one configuration, the second end may normally be spaced apart from other components of the axle assembly 10. The flaps 142 may be made of any suitable material or materials. For instance, the flaps 142 or a portion thereof may be made of a flexible material, such as a polymeric material that may permit a flap 142 to bend or flex with respect to the mounting portion 140. Alternatively, a flap 142 may be provided with a pivotable portion or pivotable coupling, such as a hinge, that may permit the flap to flex, pivot, or move with respect to the mounting portion 140. A flap 142 may be movable between a first position and a second position.

Referring to FIGS. 2 and 3, an example of flaps 142 being disposed in the first position is shown. The first position may be the normal position for a flap 142 in its free state. A flap 142 may extend from the mounting portion 140 in a direction that may extend toward the differential assembly 22 when in the first position. For instance, the free end of a flap 142 may be disposed further from the divider wall 78 and the divider wall opening 120 in the first position as compared to when the flap 142 is disposed in the second position. As such, a flap 142 may also be disposed closer to the differential assembly 22 in the first position as compared to the second position. Members of the set of flaps 142 may be spaced apart from each other in the first position. The flaps 142 may be disposed further apart from each other, disposed further from the divider wall opening center line 122, or combinations thereof when disposed in the first position as compared to the second position. In at least one configuration, a flap 142 may extend over the gear portion 130 of the drive pinion 26 when the flap 142 is in the first position. The set of flaps 142 may permit more lubricant 50 to pass through the divider wall opening 120 in the first position than in the second position as will be discussed in more detail below.

Figure 5:
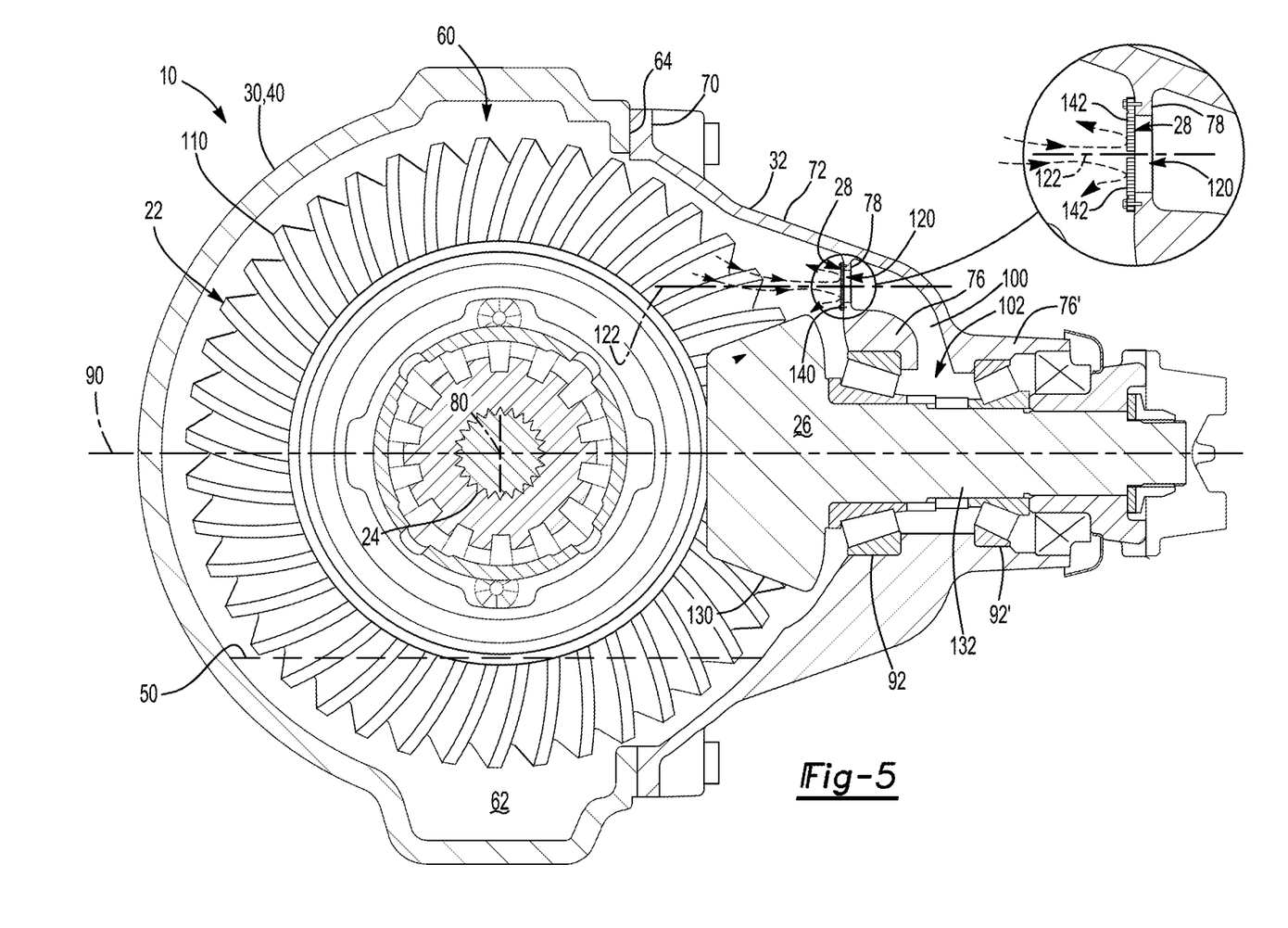
FIG. 5 is a section view showing the variable lubricant restrictor in the second position.

Referring to FIGS. 4 and 5, an example of the flaps 142 being disposed in a second position is shown. Members of the set of flaps 142 may or may not be spaced apart from each other when in the second position. For instance, the flaps 142 may be disposed closer to each other, may be disposed closer to the divider wall opening center line 122, or combinations thereof when disposed in the second position as compared to the first position. For instance, free ends of members of the set of flaps 142 may be disposed further apart from each other in the first position than in the second position. A flap 142 may also be disposed further from the differential assembly 22 in the second position as compared to the first position. For instance, the free end of a flap 142 may be disposed closer to the divider wall 78 and the divider wall opening 120 in the second position as compared to the first position. As a result, one or more flaps 142 may block or deflect splashed lubricant 50 from entering or passing through the divider wall opening 120. For instance, the flaps 142 may cooperate to block, cover, or extend over more of the divider wall opening 120 in the second position as compared to the first position. As such, the effective area of the divider wall opening 120 through which lubricant 50 may pass may be reduced in the second position as compared to the first position. In at least one configuration, a flap 142 may not extend over the gear portion 130 of the drive pinion 26 when the flap 142 is in the second position.

A flap 142 may move (e.g., bend, flex, pivot, etc.) from the first position to the second position in response to force exerted by lubricant 50 that is splashed onto a flap 142. The term "splashed lubricant" is used to refer to lubricant 50 in the housing assembly 20 that is splashed, sprayed or flung by a rotating component of the axle assembly 10, such as lubricant 50 that is splashed, sprayed, or flung from the rotating component or the sump portion 62 through the air inside the housing assembly 20. A rotating component of the axle assembly 10, such as the differential assembly 22 or the drive pinion 26, may splash lubricant 50 when it rotates about its respective axis. For instance, the ring gear 110 of the differential assembly 22 may rotate through lubricant 50 in the sump portion 62 of the housing assembly 20. As a result, the ring gear 110 may splash lubricant 50 directly out of the sump portion 62 as it enters or exits the reservoir of lubricant 50 in the sump portion 62 and may splash lubricant 50 by spraying or flinging lubricant 50 from its surfaces as it rotates, such as by spraying or flinging lubricant from its teeth when located outside of the reservoir of lubricant 50 in the sump portion 62.

Some lubricant 50 that is splashed by a rotating component, such as the differential assembly 22 or the gear portion 130 of the drive pinion 26, may be splashed against a flap 142 and may exert force against the flap 142. For instance, lubricant 50 may be directly splashed against a flap 142 by passing through the air and landing on a side of the flap 142 that faces away from the divider wall opening 120 or may be indirectly splashed against a flap 142 by passing through the air and landing on another component before dripping onto or flowing onto a flap 142. The force exerted by the sprayed lubricant 50 may urge the flap 142 to move from the first position toward the second position, and thus toward the divider wall 78 and the divider wall opening 120 to reduce lubricant flow through the variable lubricant restrictor 28 and/or the effective size of the divider wall opening 120. The amount of lubricant 50 that is splashed by a rotating component may increase as its rotational speed increases. For instance, the amount of lubricant 50 that is splashed by the differential assembly 22 or its ring gear 110 or by the gear portion 130 of the drive pinion 26 may increase as the rotational speed of the differential assembly 22 about the axis 80 increases. As a result, the amount of lubricant 50 that is splashed against a flap 142 may also increase, thereby increasing the force exerted by the lubricant 50 to bias the flap 142 toward the second position.

In the absence of a variable lubricant restrictor 28, the splashed lubricant 50 may increase churning losses or drag forces on the drive pinion 26 and/or its associated drive pinion bearing assemblies. For instance, the amount of splashed lubricant 50 that is provided to the first drive pinion bearing assembly 92, the second drive pinion bearing assembly 92', or both, may exceed the amount needed to adequately lubricate these components. Moreover, lubricant 50 may enter or collect in the chamber 102 and then may be pumped through a drive pinion bearing assembly as it rotates, which may decrease operating efficiency of the axle assembly 10 and increase vehicle fuel consumption and vehicle exhaust emissions. The variable lubricant restrictor 28 may reduce the amount of lubricant 50 that may pass through the divider wall opening 120 (and that may reach a drive pinion bearing assembly) as the rotational speed of the differential assembly 22 and the amount of splashed lubricant increases, thereby mitigating or addressing such problems.

The variable lubricant restrictor 28 may move from the second position toward or to the first position when the force exerted by the splashed lubricant 50 decreases (e.g., the force exerted by the lubricant 50 may decrease as the amount of lubricant 50 that is splashed decreases). The amount of lubricant 50 that is splashed by rotating components such as the differential assembly 22 and the drive pinion 26 may decrease as their rotational speeds decrease. Accordingly, less force may be exerted against a flap 142 and a flap 142 may move from the second position toward the first position when sufficient force is not applied by the lubricant 50. As a result, the variable lubricant restrictor 28 may permit more lubricant 50 to pass through the divider wall opening 120 to reach drive pinion bearing assemblies at lower rotational speeds, thereby providing sufficient lubricant 50 to the drive pinion bearing assemblies at lower operating speeds. It is also contemplated that a biasing member, such as spring, may be associated with a flap and may exert a biasing force that may urge the flap 142 to move from the second position toward the first position.

Figure 6:
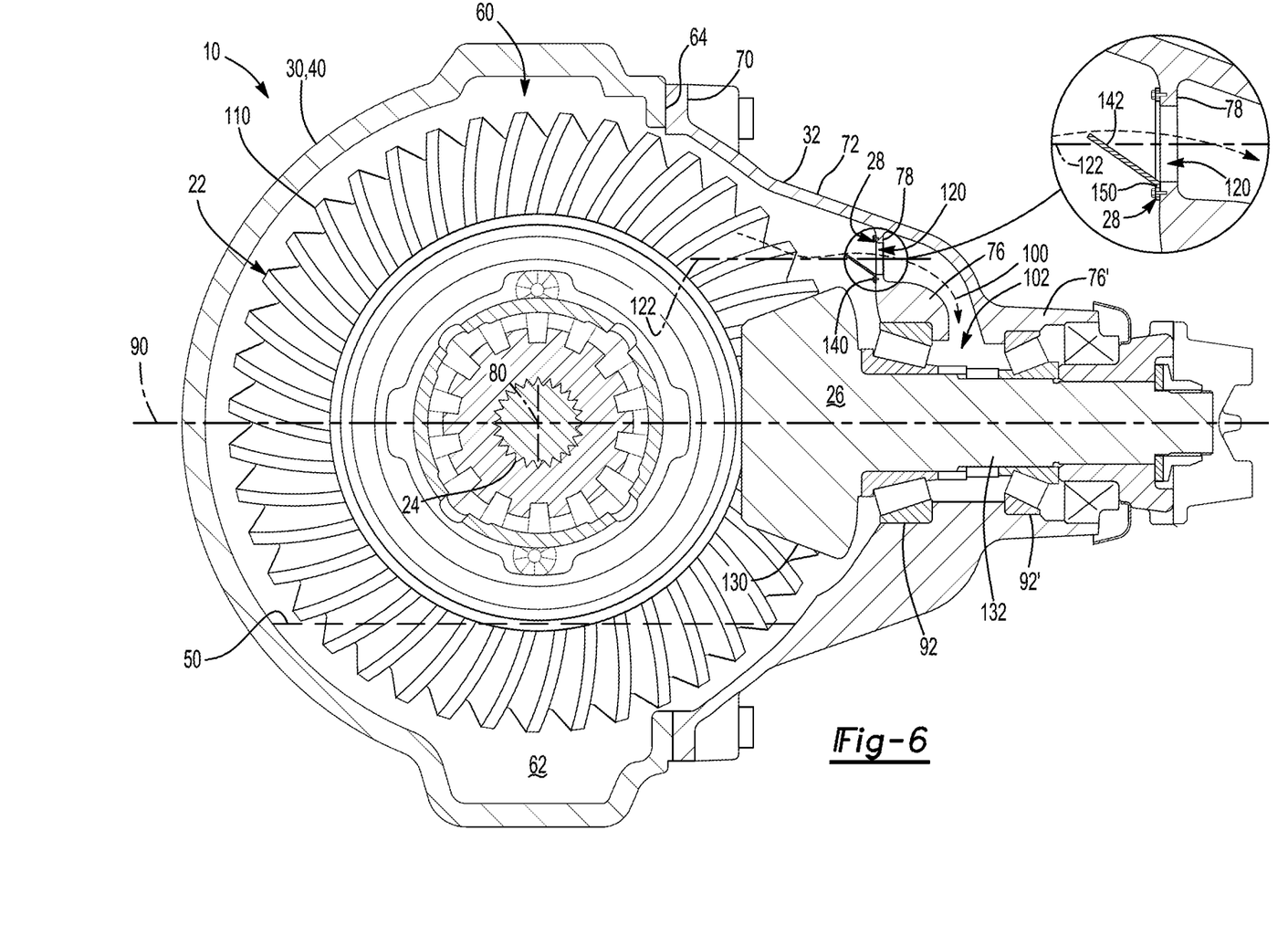
FIG. 6 is a section view of the axle assembly showing another example of a variable lubricant restrictor in a first position.
Figure 7:
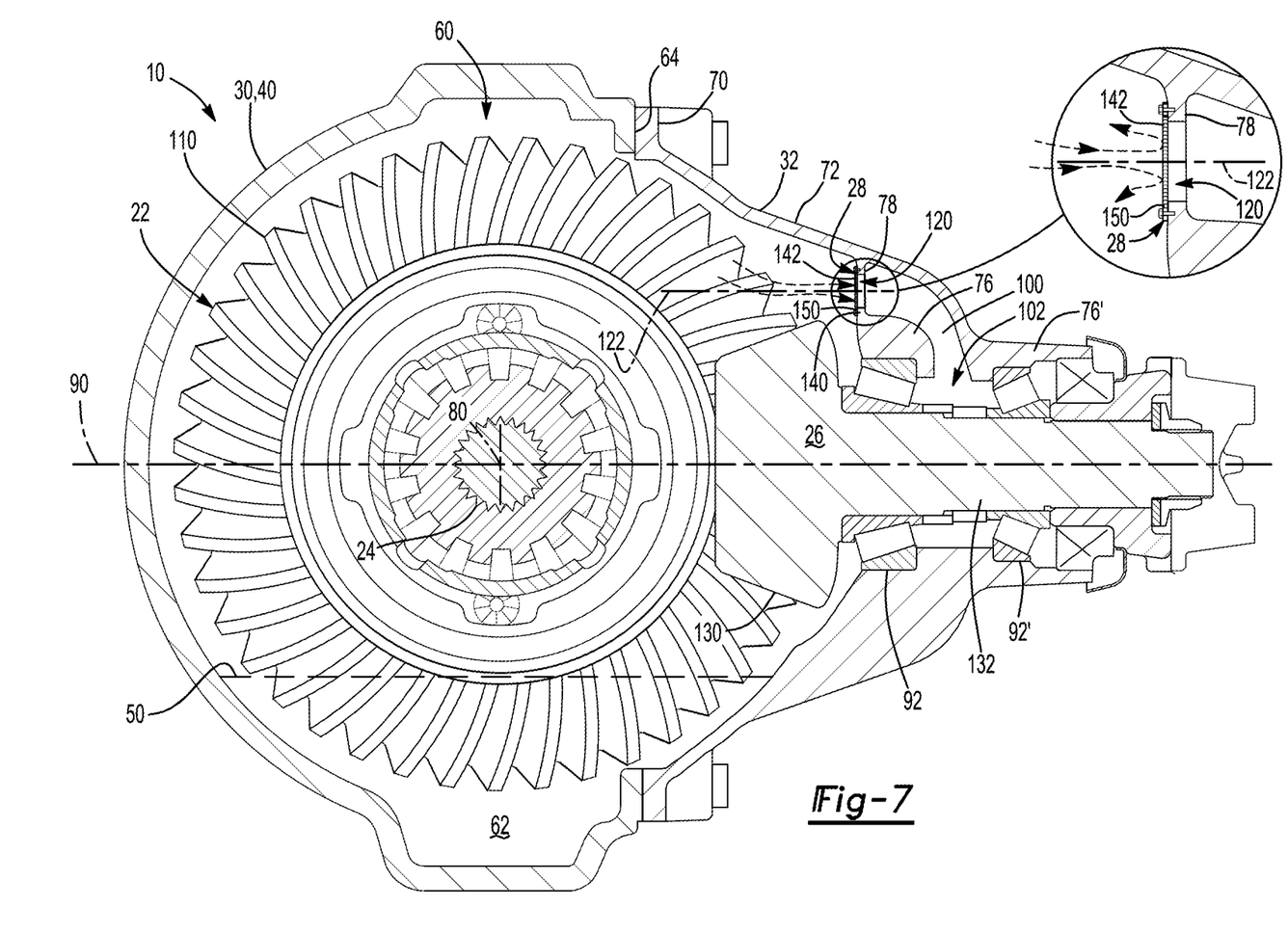
FIG. 7 is a section view showing the variable lubricant restrictor of FIG. 6 in a second position.

Referring to FIGS. 6 and 7, another example of a variable lubricant restrictor 28 is shown. This configuration provides an example of a variable lubricant restrictor 28 that may have fewer flaps than the configuration shown in FIGS. 2-4, such as a single flap 142 that may extend from the mounting portion 140.

The flap 142 may extend from the mounting portion 140 and may have any suitable shape that may partially or completely cover the divider wall opening 120 when the flap 142 is in the second position. Moreover, the flap 142 may have the same shape or different shape than the divider wall opening 120. For instance, a flap 142 having a triangular, square, or rectangular shape may be provided to cover the divider wall opening 120 having an oval or circular shape. The flap 142 may be cantilevered from the mounting portion 140 and may be made of any suitable material or materials as previously described. In this configuration, the flap 142 is depicted as having a hinge portion 150 about which the flap 142 may pivot to move toward and away from the divider wall 78.

The hinge portion 150 may be provided as a separate component or may be integrally formed with the mounting portion 140, the flap 142, or combinations thereof. For instance, the hinge portion 150 may be configured as a living hinge that may be configured as region of reduced material thickness (e.g., a groove, recess, undercut, or the like) along which a flap 142 can fold. In at least one configuration, the hinge portion 150 may extend from the mounting portion 140 and may disposed proximate or extend to the first end of the flap 142. The hinge portion 150 may be provided in any suitable location. In the configuration shown, the hinge portion is disposed proximate a bottom of the divider wall opening 120. As such, the flap 142 may extend from the hinge portion 150 in a direction that may extend away from the drive pinion axis 90 such that the free end or distal end of the flap 142 that is positioned opposite the hinge portion 150 may be disposed further from the drive pinion axis 122 than the hinge portion 150 when the flap 142 is in the first position, the second position, or both. Positioning the hinge portion 150 proximate the bottom of the divider wall opening 120 may allow gravity to may help move the flap 142 toward the first position. Moreover, such positioning may better block lubricant 50 that is sprayed by the gear portion 130 of the drive pinion 26 as compared to providing the hinge portion 150 in other locations.

An axle assembly having a variable lubricant restrictor as described above may help control lubricant distribution in a manner that may help improve operating efficiency of an axle assembly at higher operating speeds, which in turn may help improve fuel economy. Improved fuel economy may reduce energy consumption and associated costs. Reduced energy consumption may help reduce vehicle emissions in vehicles powered by petroleum products. The variable lubricant restrictor may passively control lubricant distribution directly in response to the amount of lubricant that is splashed without additional components like sensors, actuators, and controllers, that may monitor axle assembly operating conditions and control lubricant flow in response, thereby reducing complexity and cost.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an axle housing;
   a differential carrier that is mounted to the axle housing such that the differential carrier and the axle housing cooperate to at least partially define a cavity that has a sump portion that receives lubricant, wherein the differential carrier supports a drive pinion that is rotatable about a drive pinion axis and includes a divider wall that at least partially defines a divider wall opening;
   a differential assembly that is received in the cavity and is rotatable about an axis; and
   a variable lubricant restrictor that is mounted to the divider wall proximate the divider wall opening, wherein lubricant that is splashed by the differential assembly moves the variable lubricant restrictor from a first position to a second position to reduce lubricant flow through the variable lubricant restrictor.

2. The axle assembly of claim 1 wherein lubricant is splashed by the differential assembly when the differential assembly rotates about the axis.

3. The axle assembly of claim 1 wherein an amount of lubricant that is splashed by the differential assembly increases when a rotational speed of the differential assembly about the axis increases.

4. The axle assembly of claim 1 wherein the variable lubricant restrictor moves from the second position toward the first position when an amount of lubricant that is splashed by the differential assembly decreases.

5. The axle assembly of claim 1 wherein an amount of lubricant that is splashed by the differential assembly decreases as a rotational speed of the differential assembly about the axis decreases.

6. The axle assembly of claim 1 wherein the divider wall is disposed above the drive pinion axis.

7. The axle assembly of claim 1 wherein the divider wall is disposed above the drive pinion.

8. The axle assembly of claim 1 wherein the variable lubricant restrictor is disposed on a side of the divider wall that faces toward the differential assembly.

9. The axle assembly of claim 1 wherein the differential carrier includes an exterior wall that extends around the drive pinion and at least partially defines an exterior of the differential carrier and a drive pinion bearing support that receives a first drive pinion bearing assembly that rotatably supports the drive pinion, wherein the divider wall extends from the exterior wall to the drive pinion bearing support.

10. The axle assembly of claim 9 wherein the variable lubricant restrictor inhibits lubricant from flowing to a chamber that is located between the first drive pinion bearing assembly and a second drive pinion bearing assembly that rotatably supports the drive pinion when in the second position.

11. The axle assembly of claim 1 wherein a first drive pinion bearing assembly and a second drive pinion bearing assembly rotatably support the drive pinion, the first drive pinion bearing assembly is axially positioned closer to the differential assembly than the divider wall is positioned to the differential assembly, and the divider wall is axially positioned closer to the differential assembly than the second drive pinion bearing assembly is positioned to the differential assembly.

12. An axle assembly comprising:

an axle housing;

a differential carrier that is mounted to the axle housing such that the differential carrier and the axle housing cooperate to at least partially define a cavity that has a sump portion that receives lubricant, wherein the differential carrier supports a drive pinion that is rotatable about a drive pinion axis and includes a divider wall that defines a divider wall opening;

a differential assembly that is received in the cavity, supported by the differential carrier, and is rotatable about an axis; and a variable lubricant restrictor that is mounted to the divider wall proximate the divider wall opening, wherein the variable lubricant restrictor has a flap that is extendible toward the differential assembly and lubricant that is splashed by the differential assembly moves the flap toward the divider wall to reduce lubricant flow through the divider wall opening.

13. The axle assembly of claim 12 wherein the drive pinion has a gear portion that meshes with a ring gear of the differential assembly and wherein the flap extends over the gear portion when the flap is in a first position and the flap does not extend over the gear portion when the flap is in a second position.

14. The axle assembly of claim 12 wherein the flap has a hinge portion about which the flap is pivotable to move toward and away from the divider wall.

15. The axle assembly of claim 14 wherein the hinge portion is disposed proximate a bottom of the divider wall opening.

16. The axle assembly of claim 14 wherein the flap extends from the hinge portion in a direction that extends away from the drive pinion axis such that a free end of the flap that is disposed opposite the hinge portion is disposed further from the drive pinion axis than the hinge portion.

17. The axle assembly of claim 12 wherein the flap is a member of a set of flaps that extend from a mounting portion of the variable lubricant restrictor that engages the divider wall.

18. The axle assembly of claim 17 wherein members of set of flaps are movable between a first position and a second position, wherein the set of flaps permits more lubricant to pass through the divider wall opening in the first position than in the second position.

19. The axle assembly of claim 18 wherein free ends of members of the set of flaps are disposed further apart from each other in the first position than in the second position.

20. The axle assembly of claim 18 wherein members of the set of flaps are spaced apart from each other in the first position and in the second position.

* * * * *